United States Patent [19]

Bert et al.

[11] 3,886,529

[45] May 27, 1975

[54] ELECTRO-ACOUSTIC MEMORY DEVICE

[75] Inventors: Alain Bert; Gerard Kantorowicz, both of Paris, France

[73] Assignee: Thomson-CSF, Paris, France

[22] Filed: Dec. 26, 1973

[21] Appl. No.: 427,573

[52] U.S. Cl..... 340/173 CR; 315/21 MR; 333/30 R; 340/173 MS

[51] Int. Cl. ...................... G11c 11/30; G11c 27/00

[58] Field of Search 340/173 CR, 173 RC, 173 MS, 340/174 MS; 315/21 MR; 333/30 R; 179/15.55 R

[56] References Cited

UNITED STATES PATENTS

| | | | |
|---|---|---|---|
| 3,668,662 | 6/1972 | Zimmerman et al. | 340/173 RC |
| 3,701,147 | 10/1972 | Whitehouse | 340/173 RC |
| 3,750,043 | 7/1973 | Epsztein | 330/43 |

*Primary Examiner*—Stuart N. Hecker
*Attorney, Agent, or Firm*—Roland Plottel

[57] ABSTRACT

A piezoelectric substrate (1) exhibiting sufficient electric isolation is equipped at its both ends with an input transducer (2) and an output transducer (3). There is formed a permanent electrostatic image of the acoustic wave induced at the surface of substrate (1) by a given high frequency signal applied at the input transducer, by means of an electron beam (4), deflected toward the substrate so as to impinge on the the zone covered by the acoustic wave. Readout of this image is obtained by a second electron bombardment. Deflection of the beam (50) is achieved by means of a difference in potential applied between the electrode (5) and elements (60, 61, 62 . . . ).

The device enables a train of signals applied at the input transducer to be addressed and coded.

3 Claims, 1 Drawing Figure

ELECTRO-ACOUSTIC MEMORY DEVICE

Figure 1:
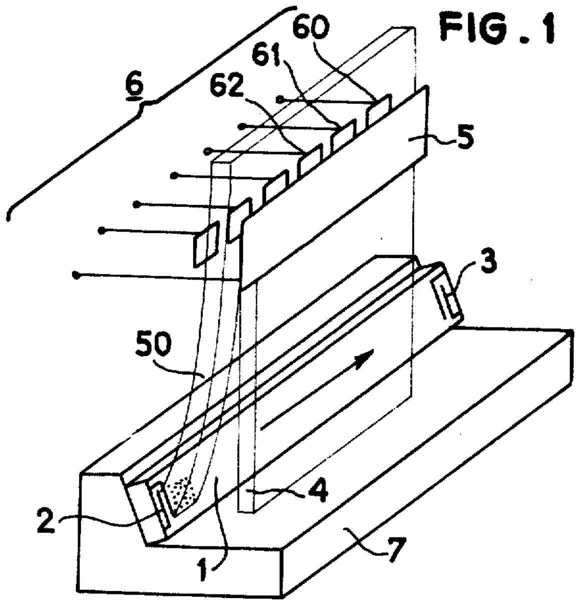

The invention relates generally to memory devices and particularly to electro-acoustic memory devices.

This invention relates to electro-acoustic devices in which a piezoelectric substrate is used to transmit a high-frequency signal, such as one used in radio apparatus, applied to an input transducer mounted on the substrate and which transducer generates elastic waves propagating along the surface of the substrate, most often towards a second transducer. These devices, sometimes called micro-acoustic devices, are known in the art. Their substrate consists of a plate with a given orientation, cut from a piece of piezoelectric such as mono or poly crystalline quartz, and to which the term crystal is generally applied.

This invention is particularly concerned with those devices in which the signal is stored or recorded by sweeping the surface of the crystal, along which the acoustic wave train corresponding to the signal is traveling, with an electron beam whose charges create on the surface of the crystal, by secondary emission produced under their impact, a potential distribution which is a replica of the signal in question. This potential distribution remains fixed to the surface of the isolating substrate thereby constituting an electrostatic image of the wave train in the state in which it existed at the moment of sweep. The signal is read by a second sweep of the electron beam, canceling by a similar mechanism this potential distribution. The effect of this cancellation is to create an elastic wave at the surface of the crystal which is a reproduction of the initial wave and which propagates, inducing a signal in the output transducer attached to the crystal. Furthermore, this wave can travel in both directions on the surface of the crystal and, because of this, can be collected by the input transducer. This type of device has been described, in U.S. Pat. No. 3,750,043 granted on July 31, 1973, and assigned to the same assignee as the present application.

The present invention relates to electro-acoustic memory devices, or more simply, acoustic memories of the type above referred to, in which the memory function is more extensive and allows more flexibility than that of the devices of prior art according to the cited patent particularly.

The invention will be better understood by referring to the detailed description which follows and to the attached FIGURE, which represents in a diagrammatic way a nonlimiting example of the acoustic device of the invention.

The description of certain electronic hardware incorporated into this device has been purposely omitted from the figure; as such a representation would only needlessly complicate the figure, and this hardware is known from their description in the cited patent, and from the general technology of electron beam devices.

In the FIGURE, there is shown a piezoelectric substrate 1 in the form in which it usually occurs in this type of device, that is, as an elongated block of piezoelectric material, exhibiting sufficient electric isolation, with an input transducer 2, and an output transducer 3. The arrow in the figure indicates the direction in which an elastic wave travels along the surface of the substrate. In order to clarify the ideas under discussion, this arrow has been drawn pointing from left to right. However, as has been previously indicated, the direction of the arrow is that of only one of the two waves stimulated along the surface of the crystal at the time of read-out.

In the embodiment of the FIGURE, the input transducer 2 and the output transducer 3 are arranged at both ends of the rectangular plate 1 which makes up the piezoelectric substrate. When working with very high frequencies in the order of hundreds of megacycles, the transducers often assume, as is the case on the figure, the shape of interleaved combs, only one finger of which has been drawn here, in a diagrammatic way, to indicate each transducer. The various signals to be put into memory are applied to the input transducer 2; they induce acoustic wave trains traveling on the surface of substrate 1; the various wave trains corresponding to the signals follow each other in the direction they are traveling. When the first signal reaches output transducer 3, its write-in is done according to the mechanism described above, i.e., by a very rapid sweep of the surface of substrate 1 with an electron beam which impacts on the substrate covering the entire zone of the substrate occupied by the corresponding acoustic wave trains. In the figure, an electron beam 4, in the example here is in the shape of a flat beam which passes between deflection electrodes shown here as plates 5 and 6, and which beam—so long as no differences in potential are applied between the electrodes—falls in a direction perpendicular to support 7 and on to support 7. When a difference in potential is applied between these electrodes 5 and 6, the beam is deflected toward substrate 1 so as to impact upon it. The write-in can be accomplished simultaneously for all the signals present on the substrate by deflecting all of beam 4 toward the substrate through the application of the same difference in potential between plate 5 and all elements 60, 61, 62, . . . which constitute plate 6. The write-in can also be accomplished for each signal in succession in the order in which they were applied to the input transducer, by the application also in succession of the preceding difference in potential between plate 5 and plates 60, 61, 62; in the latter case, only a portion of the beam is deflected to produce an impact on substrate 1; an example of this portion of the beam is represented by beam 50, whose impact on substrate 1, is indicated by a dotted surface, and covers the zone occupied by the wave train corresponding to one of the applied signals.

After this write-in sweep, one has available between transducers 2 and 3, pattern of potentials representing the various signals traveling along substrate 1 at the moment of the write-in sweep, and one can subsequently read them in a given sequence. For example, signals applied to input transducer 2 at very long intervals of time, can be recorded, and then reproduced in a very short time, either in the order in which they were applied, or in a different order; or instead, they can be reproduced at even longer intervals either in the same order they were applied or in a different order.

In the case of signals having the same duration and which follow one another at regular intervals, it is also possible, to regulate the difference of potential applied between electrode 5 and parts 60, 61, 62, . . . of electrode 6, (for example, in advance and at said regular intervals) so as to record each signal at the moment the wave train corresponding to it arrives at the end of its course along the plate of piezoelectrical material 1, that is, near the wave train preceding it. It is possible to make activation of the write-in sweep, that is the difference in potential in question, dependent on the signals themselves.

As indicated above, during read-out, signals may be reproduced in the order and in the time sequence required. In this manner, the device shown in the figure permits a compression in time of a group of signals and in a general way enables a train of signals applied at the input transducer to be addressed and coded.

We claim:

1. An electro-acoustic memory device comprising a piezoelectric substrate; an input and an output transducer mounted thereon at its both ends for transmitting high frequency signals from said input transducer toward said output transducer by means of elastic waves propagating along the surface of the substrate; means for sweeping said surface with a beam of electrons which interact with said elastic wave and provide a record of said wave by providing a potential distribution on said surface, said sweeping means also subsequently sweeping said surface with a beam of electrons to cancel said potential distribution and stimulate elastic waves propagating on said substrate, and which are a reproduction of the recorded wave; and including means for selectively operating said sweeping means to impinge the electron beam on different zones of said surface disposed side by side in the direction of said wave propagation in a selective fashion and in a preferential order.

2. An electro-acoustic memory device according to claim 1, wherein said substrate is positioned on a support in inclined relation with said support, wherein said sweeping means comprise a source of electrons and electrode means including a plurality of electrodes cooperating with said source for producing said beam, said electrode means comprising first means for directing that beam toward said support and second means for deflecting a part of said beam toward said substrate so as to make said part to impinge onto said zones in a selective fashion and in a preferential order.

3. An electro-acoustic memory device according to claim 2, wherein said second means comprise two deflecting plates, one of which, a first plate, is of one piece and the other of which, a second plate, is made of a plurality of pieces insulated from one another and means to apply a difference in potential between said first plate and at least one of the pieces of said second plate.

* * * * *